Aug. 11, 1959  AKE B. JANSSON  2,898,713
ADJUSTABLE WORK PIECE HOLDER
Filed June 28, 1957  6 Sheets-Sheet 1

Inventor
A. B. Jansson
By Hancock Downing Seebold
Attys.

Inventor
A. B. Jansson

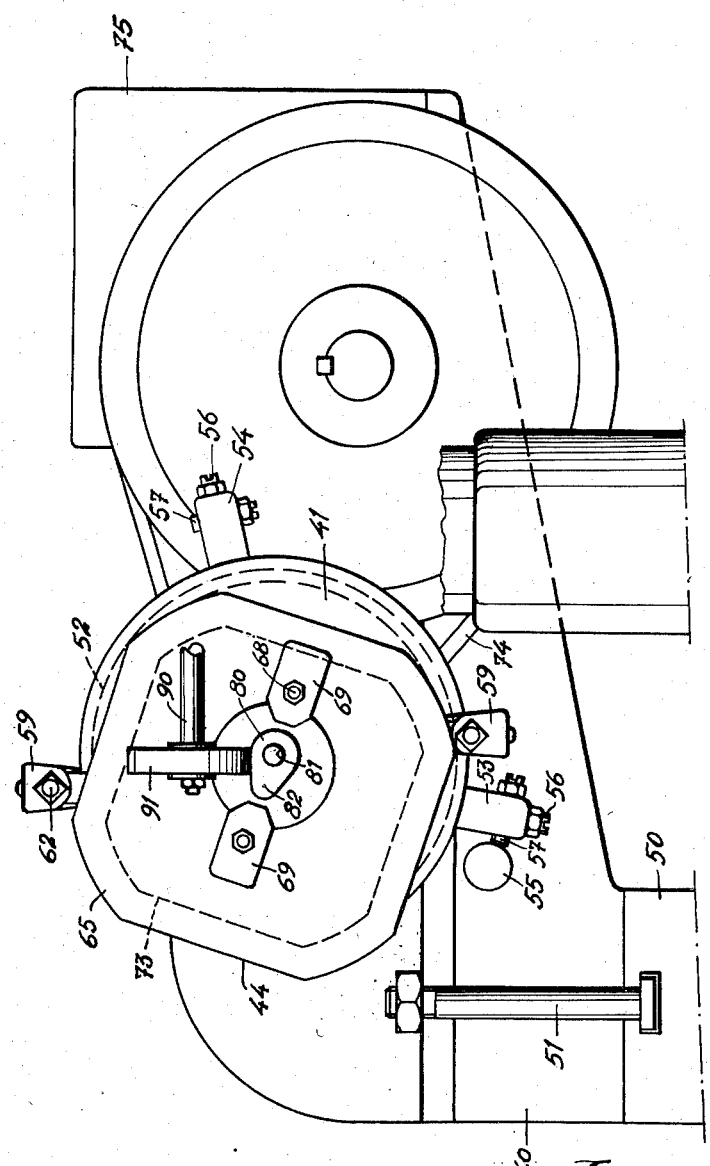

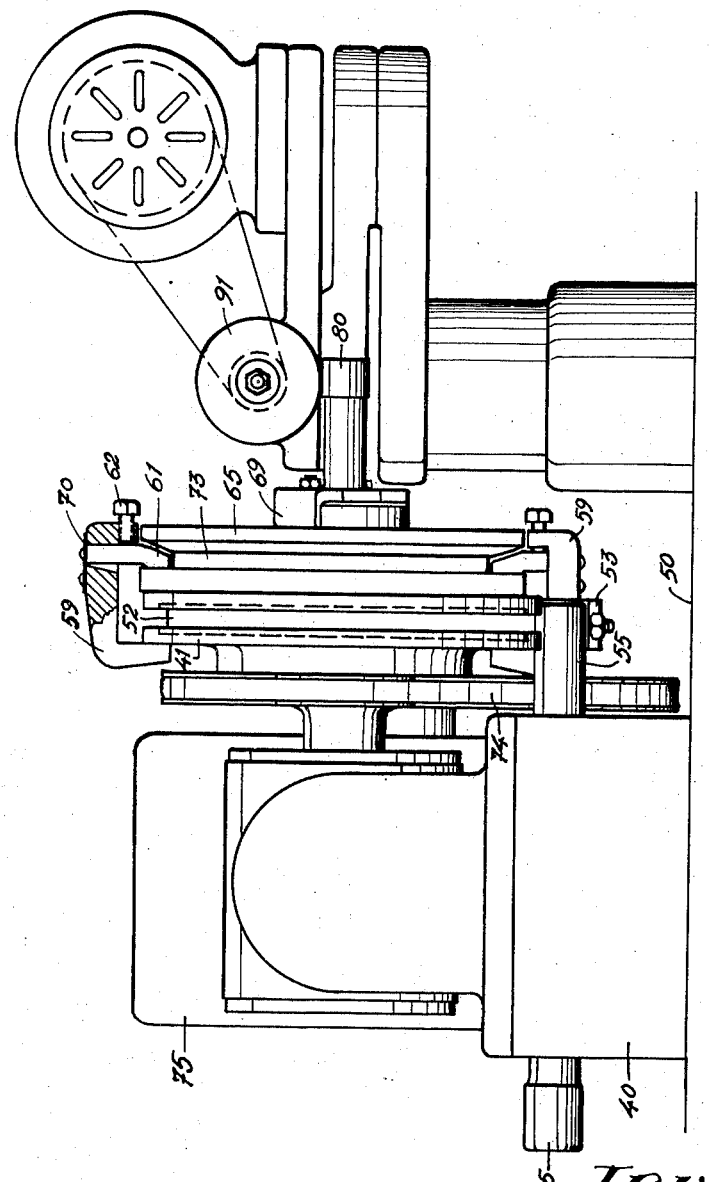

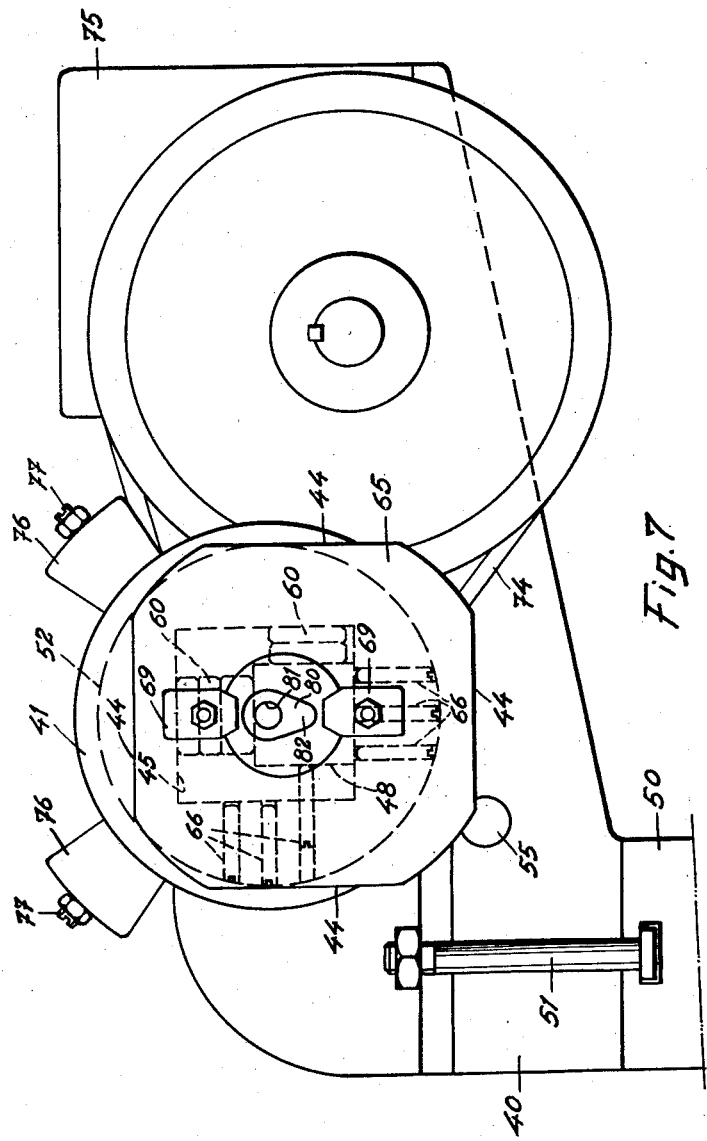

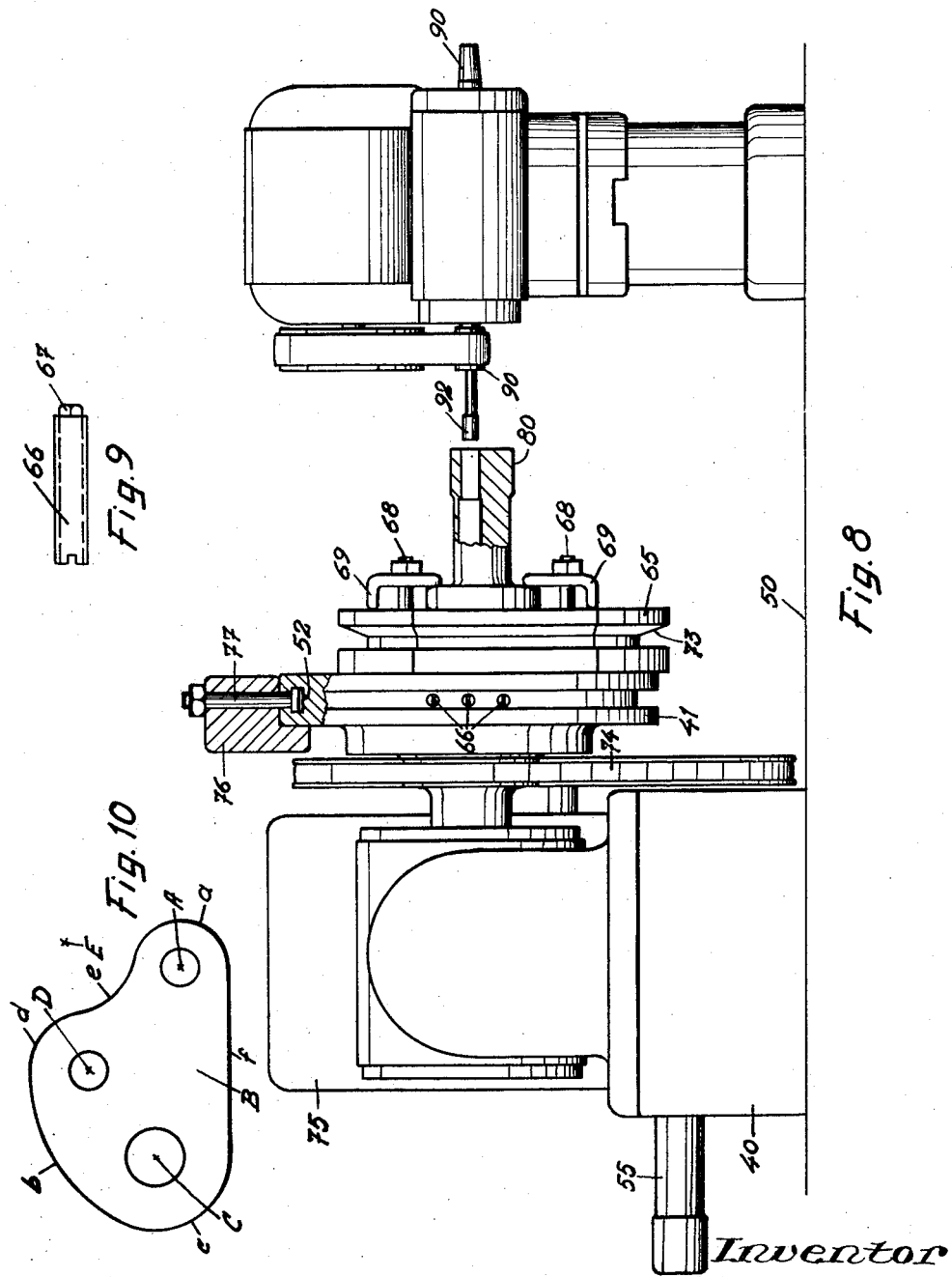

United States Patent Office 2,898,713
Patented Aug. 11, 1959

2,898,713

ADJUSTABLE WORK PIECE HOLDER

Åke Bertil Jansson, Huskvarna, Sweden

Application June 28, 1957, Serial No. 668,688

Claims priority, application Sweden July 10, 1956

6 Claims. (Cl. 51—217)

This invention relates to a device for the adjustable fixing of the work piece in a tool machine, especially a grinding machine.

The invention has for its object to facilitate precise machining of pieces having such a shape that the machining preferably is carried out from a plurality of separate centres. Compared to known means for this purpose, the device according to the invention is small and light in weight although its area of adjustment is considerable. Furthermore the device can be manufactured at a comparatively very low price.

By means of the device, intricate form grinding will be carried out rapidly and with a high degree of accuracy in a common universal grinding machine. In addition to grinding machines, the device is useful also in milling machines and lathes of different kinds. More particularly, the invention is for use in the grinding of very fine tools for powder metallurgy, the producing of counters and the milling of intricate elements.

The device comprises a table having means for its clamping to the tool machine and a block that is slidable parallel to the surface of the table, and is mainly characterized in that the block has means for fixing the work piece thereto and can in two mutually perpendicular directions be tightened up to gauge blocks which are supported by honed heads on the table.

The invention will hereinafter be more fully described with reference to some embodiments shown in the accompanying drawings. In the drawings:

Figs. 5 and 6 illustrate the use of the device for external form grinding,

Figs. 7 and 8 illustrate the use of the device for internal grinding,

Fig. 9 shows a part of the device shown in Fig. 7, and

Fig. 10 shows a typical product of grinding with use of the device.

Figure 2:
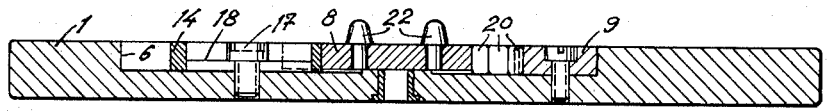
Fig. 2 shows a sectional view on the line II—II in Fig. 1.
Figure 1:
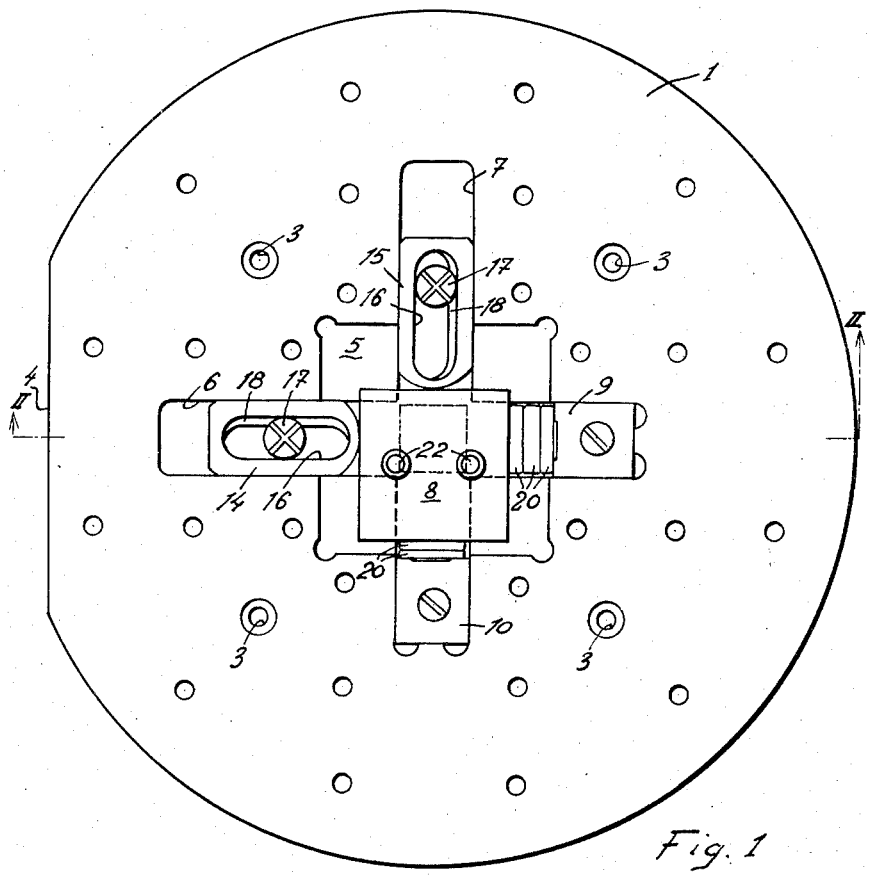
Fig. 1 shows a plan view of the table and the adjustable block.
Figure 4:
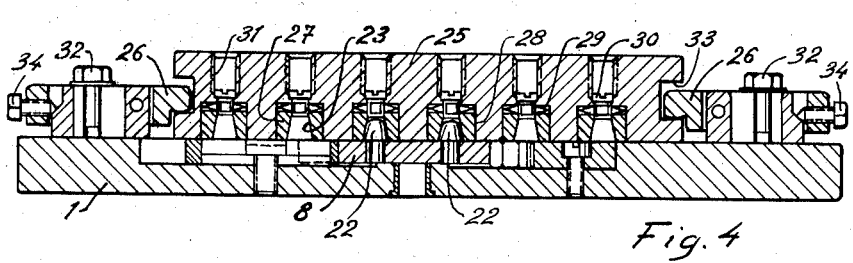
Fig. 4 shows a sectional view on the line IV—IV in Fig. 3.
Figure 3:
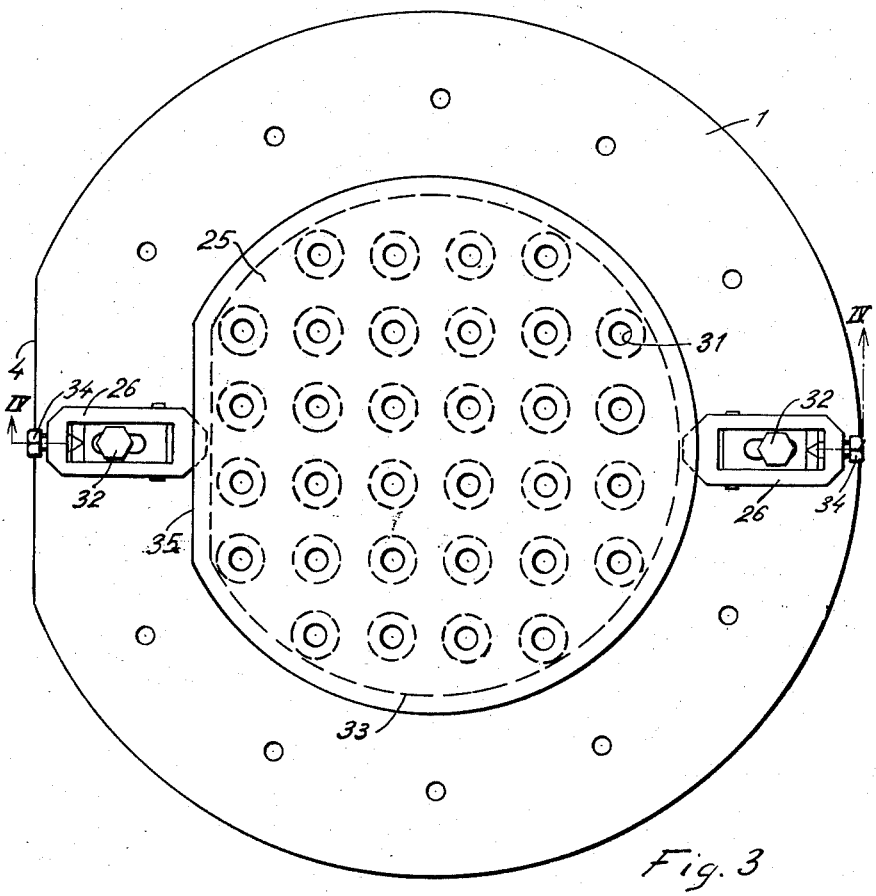
Fig. 3 shows a plan view of the table and a holder for the work piece.

The device comprises a table 1 having two similar plane and parallel surfaces and preferably being made of steel and hardened. The table is adapted to be clamped to the face plate of a lathe, a circular feed table of a milling machine or the corresponding part of a grinding machine by means of bolts (not shown) through countersunk holes 3. The table 1 may have a circular or other form, but it should have at least one straight edge 4 for the purpose of facilitating alignment of work pieces. In its middle, the table 1 has a square cavity 5, which is symmetrically crossed by two mutually perpendicular grooves 6 and 7 extending exteriorly of and being slightly deeper than the cavity. Placed in the cavity is a square block 8 that rests on the bottom of the cavity and does not project above the surface of the table 1 but is nearly flush therewith. The block 8 is so much smaller than the cavity 5 that its centre point may be adjusted to any one position about the centre point of the table 1 within a square having for example a 30.00 mm. side. For the purpose of exact positioning of the block 8 in the cavity 5, the grooves 6 and 7 each have a hardened and honed steel-head 9, 10, respectively, mounted at one of its ends. For the same purpose, tightening rods 14 and 15 are slidably mounted at the opposite ends of the grooves. Each rod has a slot 16 in which the head 17 of a bolt is movable, the bolts being threaded into the table 1. Upon tightening the bolt, the underside of its head 17 comes into frictional engagement with a contact surface 18 only at one side of the slot 16 thereby forcing the rod against the block 8. By means of the rods 14 and 15, the block 8 may be tightened up against gauge blocks 20 which are placed before the honed surfaces of the heads 9 and 10. Projecting from the upper face of the block 8 are two taper pins 22 which are hardened and ground to exact shape and size and driven into holes in the block. The pins 22, in the manner shown in Fig. 4, cooperate with tapered seatings 23 in a table-like holder 25 for work pieces, the holder being attachable to the table 1 by means of clamps 26. The seatings 23 are in the shown embodiment concentrically located in cylindrical bushings 27 which frictionally fit into cylindrical holes 28 in the holder 25 and slidable down the holes against the force of cup springs 29. Bolts 30 which pass through holes 31, countersunk from the opposite side of the holder 25, are screwed into the bushings 27 thereby preventing them from projecting over the surface of the holder 25. There are many more holes 28 than pins 22, and the holes are carefully distributed over the surface of the holder 25 so as to form points in a network of squares, each having for instance a 30 mm. side. The distance between the pins 22 is just equal to the side measure of the squares, and the length of the pins is so matched that at application of the holder 25, the pins with certainty come in contact with the seatings 23 before the holder comes to rest against the table 1. By moving the pins 22 from one pair of seatings 23 to another, the holder 25 thus will be moved in carefully known steps and in two mutually perpendicular directions over the block 8 which in turn is slidable over an area at least covering these steps, as stated. In the embodiment shown in Figs. 1–4 whatever point on the holder 25 thus can be placed in whatever position within a square having 5 times 30=150 mm. side. The holes 31 are threaded at their upper, wider parts and are used as mounting holes for clamps or other means for clamping the work piece to the surface of the holder 25. The said clamps 26 attach in a circumferential groove 33 in the edge of the holder 25 and have preferably one part that is to be tightened to the table by means of a bolt 32 and another part that is hinged to the said part, the hinged part by lever action moving the holder 25 in normal direction to the table 1 by tightening a bolt 34. Also, the holder 25 has at least one straight edge 35.

In the embodiment shown in Fig. 5 a table 41, essentially corresponding to the said table 1, is rotatably carried by a bracket 40 which is mounted on the feed table of a universal grinding machine by means of bolts 51. The table 41 is round and has an annular groove of T-shaped section, the groove serving as an attachment for adjustable stops 53, 54 which are used to limit the turning angle of the table by cooperation with a retractable stop means 55 on the bracket 40. The stops 53, 54 are each mounted to the table 41 by means of a bolt 56 and can also be finely adjusted by means of adjusting screws 57. To the table 41 a holder 65, corresponding to the said holder 25 but having four straight edges 44, is clamped by means of special clamps 59. As best shown in Fig. 6 each clamp comprises a U-shaped main part and a tooth 61 that is attached thereto by means of a leaf spring 70. The tooth 61 fits into the groove 73 of the holder 65 and is to be tightened by means of a bolt 62. The holder 65 is in the aforesaid manner adjustable over the surface of the table 41, the position of a cavity 45 in the table, a holder carrying block 48 and gauge blocks 60 being shown by broken lines in Fig. 7. The mounting of the holder 65 is such that it assures parallelism between the edges 44 of the holder 65 and sides of the cavity 45. For the purpose of tightening the block 48 against the gauge blocks 60, there are clamp bolts 66 which are in two perpendicular directions threaded into the table 41 from the bottom of its annular groove 52. As shown in Fig. 9, each bolt 66 has a slot in its outer end and a square 67 at its inner end. When the holder 65 is removed, the bolts 66 therefore are within reach for tightening whatever the positions of the block 48 and the stops 53, 54 may be. The use of three parallel clamp bolts 66 enables symmetrical tightening of the block 48 in each position and improves thereby the precision of the assembly. For the purpose of convenient clamping of work pieces to its surface, the holder 65 has a number of threaded holes which receive bolts 68 for clamps 69. To permit grinding of cylindrical surfaces by rotating the work piece, the table 41 is by means of a V-belt 74 coupled to an electric motor 75 which is mounted on the bracket 40. To counterbalance the holder at such operation, counterweights 76 can be mounted to the table 41 by means of bolts 77 which are slidable in the annular groove 52. The stop means 55 on the bracket then is placed into its retracted position. The device works as follows:

A work piece having a suitable working allowance, for example the material to be punched shown in Figs. 5–8, is clamped to the holder 65 by means of the clamps 69, the holder then being slightly eccentrically positioned on the table 41. At the clamping is checked so that the expected centre of the hole 81 in the punch coincides with the centre of the table 41 within the limits given by the working allowance and so that a line through the centre of the hole and another working centre on the punch is parallel to one of the holder's straight edges 44 within the same limits. Then the stops 53, 54 are adjusted so that the maximum turning angle of the table 41 is equal to the angle of the arched contour portion about the hole 81 of the punch. With the spindle 90 of the grinding machine positioned at a right angle to the shaft of the table 41 and a grinding wheel 91 mounted thereon, as shown in Figs. 5 and 6, the outer contour about the hole 81 as well as the adjacent straight edges of the punch is ground by push-pull motions of the feed table 50 in coordination with a manual turning of the table 41. Control of the dimensions of the punch may take place during the work and can preferably be carried out by means of a stand-micrometer which is set to zero at the centre of the table 41 when standing on the table 50. A great advantage of the device is that the work piece during the working operation may be taken out of the machine for fitting, control or the like and then be reset exactly in its former position. This is done by detaching the clamps 69, whereupon the holder 65 may be pulled out of the taper pins 22 on the block 48. The block is not moved thereby, and the pins assure by cooperation with the spring loaded bushings in the holder 65 that the holder assumes its original position when attached again to the table. After final grinding of the said parts of the punch, the work may be continued by grinding the arched outer contour about the other center 82 of the punch. Transition to the new center of work is performed by detaching the holder 65 from the block 48, loosening the clamp bolts 66 and adapting the stacks of gauge blocks 60, so that the holder 65, when again mounted to the block 48 with the pins thereof cooperating with the same or other holes in the back of the holder, is moved exactly the distance between the centers. Thereafter the holder is again clamped to the table 41 by means of the bolts 66. After adjustment of the stops 53, 54 to the new, smaller angle, the grinding may continue in the said manner. When the grinding of the outer contour of the punch is completed, the holder 65 is moved back to its first position by a new insertion of the first used gauge blocks in the table 41. Then the stop means 55 is retracted to its rest position and the holder 65 is counterbalanced by means of weights 76 mounted to the table 41, as shown in Figs. 7 and 8. The spindle 90 now is brought in parallelism with the shaft of the table 41, and the grinding wheel 91 is replaced by a grinding pin 92. When the balance of the table 41 is made satisfactory by adjustment of the weights 76, the motor 75 may be started for continuous running. Now the hole 81 in the punch may be ground with high accuracy by feeding the feed table 50 and thereby the fastly rotating grinding pin 92 axially into the counter-rotating work piece.

On machining the work piece for the product shown in Fig. 10, the transitions between the five separate centers of work A, B, C, D and E is performed essentially in the said manner, but as the centers are not aligned, both stacks of gauge blocks have to be altered at most of the transitions. Preferably the work piece then is fixed to the holder having its straight edge f parallel to one of the straight edges of the holder. The succession of machining is in Fig. 10 indicated by giving the contour lines symbols a, b, c, d, e and f in conformity to the letters used as symbols for their work centers. Sometimes, of course, it will be the best way of working that both the internal and the external machining is performed by changing the tool before the transition to the next center of work.

I claim:

1. An assembly for the adjustable fixing of a work piece in a tool machine, particularly a grinding machine, said assembly including a table adapted to be mounted on the machine, block means slidable parallel to one surface of the table, securing means on the block means operable to fix a work piece thereto, gauge blocks cooperable with the block means, further gauge blocks cooperable with the block means perpendicular to the first named gauge blocks, honed heads positioned between the gauge blocks and further gauge blocks and the table, and adjustable means cooperable with the said table and the block means diametrically opposite the gauge blocks and further gauge blocks to tighten said block means against the gauge blocks and further gauge blocks whereby the block means is movable in two directions perpendicular to each other and the work piece being removable from the block means without changing the position of the block means on the table.

2. An assembly as claimed in claim 1 wherein said securing means includes at least two tapered pins projecting above the block means engageable selectively in conical apertures symmetrically positioned in one face of a holder for the work piece.

3. An assembly as claimed in claim 2 wherein each conical aperture is formed in a cylindrical bushing fitted in a cylindrical hole in the holder and spring means cooperable with the holder and bushing for forcing the said bushing outwardly of the hole.

4. An assembly as claimed in claim 1 further including means for mounting the table for rotation on the machine, the table having a circumferential groove therein, and adjustable mounted counterweights cooperably associated with the groove.

5. An assembly as claimed in claim 1 further including means for mounting the table for rotation on the machine, stop means adjustably carried by the periphery of the said table, and fixed stop means on the machine cooperable with the adjustable stop means to limit the turning angle of the table.

6. An assembly for the adjustable fixing of a work piece in a tool machine, particularly a grinding machine, said assembly including a table adapted to be mounted on the machine, the table having a rectangular cavity therein and two perpendicular grooves extending beyond and entering said cavity, block means of lesser dimensions than the cavity positioned in the cavity with the upper face of the block means being substantially flush with the face of the table, a honed head positioned in each groove at one end thereof, gauge blocks in each groove located between each honed head and one side of the block means, adjustable rods slidably mounted in each of the grooves diametrically opposite the gauge blocks for engagement with a side of the block means, whereby the block means can be held against the gauge blocks, means to lock the rods in their adjusted positions, and means extending upwardly from the block means serving to secure a work piece to the table with the work piece being removable from the upwardly extending means without changing the position of the block means in the cavity of the table.

References Cited in the file of this patent

UNITED STATES PATENTS

| | | |
|---|---|---|
| 1,954,708 | Mass | Apr. 10, 1934 |
| 2,406,043 | Sorensen | Aug. 20, 1946 |